(12) United States Patent
Harris et al.

(10) Patent No.: US 7,717,607 B2
(45) Date of Patent: May 18, 2010

(54) SYSTEM AND APPARATUS FOR KEYBOARD ILLUMINATION

(75) Inventors: John Michael Harris, Liberty Lake, WA (US); Bryan McKeirnan, Otis Orchard, WA (US)

(73) Assignee: General Dynamics Itronix Corporation, Spokane Valley, WA (US)

( * ) Notice: Subject to any disclaimer, the term of this patent is extended or adjusted under 35 U.S.C. 154(b) by 419 days.

(21) Appl. No.: 11/929,441

(22) Filed: Oct. 30, 2007

(65) Prior Publication Data

US 2009/0109649 A1    Apr. 30, 2009

(51) Int. Cl.
*F21V 33/00* (2006.01)
(52) U.S. Cl. .................................... 362/633; 362/632
(58) Field of Classification Search ................. 362/632, 362/633
See application file for complete search history.

(56) References Cited

U.S. PATENT DOCUMENTS

| | | | |
|---|---|---|---|
| 5,379,201 A | 1/1995 | Friedman | |
| 5,684,513 A | 11/1997 | Decker | |
| 5,815,225 A | 9/1998 | Nelson | |
| 6,040,822 A | 3/2000 | Decker | |
| 6,145,992 A | 11/2000 | Wattenburg | |
| 6,161,944 A | 12/2000 | Leman | |
| 6,191,939 B1 | 2/2001 | Burnett | |
| 6,380,921 B2 | 4/2002 | Nakamura | |
| 6,561,668 B2 | 5/2003 | Katayama et al. | |
| 6,776,497 B1 | 8/2004 | Huppi et al. | |
| 7,090,368 B2 | 8/2006 | Oross et al. | |
| 2002/0064055 A1 | 5/2002 | Takahashi et al. | |
| 2005/0047073 A1 | 3/2005 | Lo | |
| 2005/0163310 A1* | 7/2005 | Lundell et al. | 379/433.07 |
| 2006/0164378 A1 | 7/2006 | Phillips et al. | |
| 2007/0103918 A1 | 5/2007 | Lin | |

FOREIGN PATENT DOCUMENTS

JP    8-314598    11/1996

* cited by examiner

*Primary Examiner*—David V Bruce
(74) *Attorney, Agent, or Firm*—Hunton & Williams, LLP

(57) ABSTRACT

A portable computing device, including a keyboard illumination device and system may include a light emitter housing incorporated into the hinge element of a portable computing device. The light emitter housing may include an aperture and a light emitter and may be configured to illuminate a keyboard while keeping the source of the emitted light hidden from the user and others who may be in the vicinity of the portable computing device. The light emitter, which illuminates the keyboard, may be driven by a different light source than the light source that illuminates a display panel of the portable computing device. It follows that the brightness of the light emitter may be adjusted without having any effect on the brightness of the display panel.

28 Claims, 10 Drawing Sheets

SYSTEM AND APPARATUS FOR KEYBOARD ILLUMINATION

BACKGROUND INFORMATION

In recent years, decreased prices and increased processing capability have resulted in a dramatic increase in the use of portable computing devices. Consumers are attracted to portable computing devices because, among other things, they are lightweight and allow users to perform computing tasks outside of the confines of an office. Portable computing devices are utilized in many places where computing was not previously possible (e.g., planes, automobiles, park benches, at home on a couch, etc.). The versatility of a portable computing device, however, can be limited by insufficient lighting conditions. When there is an insufficient amount of available ambient light, a user may have difficulty seeing the keyboard and may therefore find it difficult to accurately and efficiently operate the portable computing device.

To provide ambient light, some laptop computers provide task lights mounted to the top surface of the display, which is attached to the keyboard using a hinge. In this configuration, the area of illumination provided by the task lights changes when a user moves the display relative to the keyboard. When the display is tilted beyond a certain angle, the task light may fail to illuminate the keyboard at all. Tilting the display may also cause a direct light source to be visible to the user or bystanders in the vicinity. This visible direct light source can be a distraction and annoyance.

Other laptop computers illuminate the keyboard by directing a portion of light from the display panel to the keyboard. Because the keyboard illuminator and display panel share a common light source, if a user were to reduce the display brightness in a low-light environment, the light directed to the keyboard would correspondingly be reduced. When a user adjusts one, the other is necessarily adjusted as well. Additionally, this configuration may reduce display brightness, because energy is diverted from the display to the keyboard illuminators.

Certain other keyboard illumination techniques rely on moving parts, such as shutters or doors, to hide the task light when it is not needed. In such systems, the moving parts are subject to mechanical failure.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

Advantages of these and other embodiments will become apparent from the following detailed description, which taken in conjunction with the accompanying drawings, describe by way of example—and not limitation—principles of various exemplary embodiments.

DETAILED DESCRIPTION OF EXEMPLARY EMBODIMENTS

A portable computing device, including a keyboard illumination device and system may include a light emitter housing incorporated into the hinge element of a portable computing device. The light emitter housing may include an aperture and a light emitter, and may be configured to illuminate a keyboard while keeping the direct source of the illumination hidden from the user and others who may be in the vicinity of the portable computing device. The light emitter, which illuminates the keyboard, may be driven by a different light source than the light source that illuminates a display panel of the portable computing device. It follows that a user may adjust the brightness of the light emitter, and consequently the amount of light directed to the keyboard, without having any effect on the brightness of the display panel.

Figure 1:
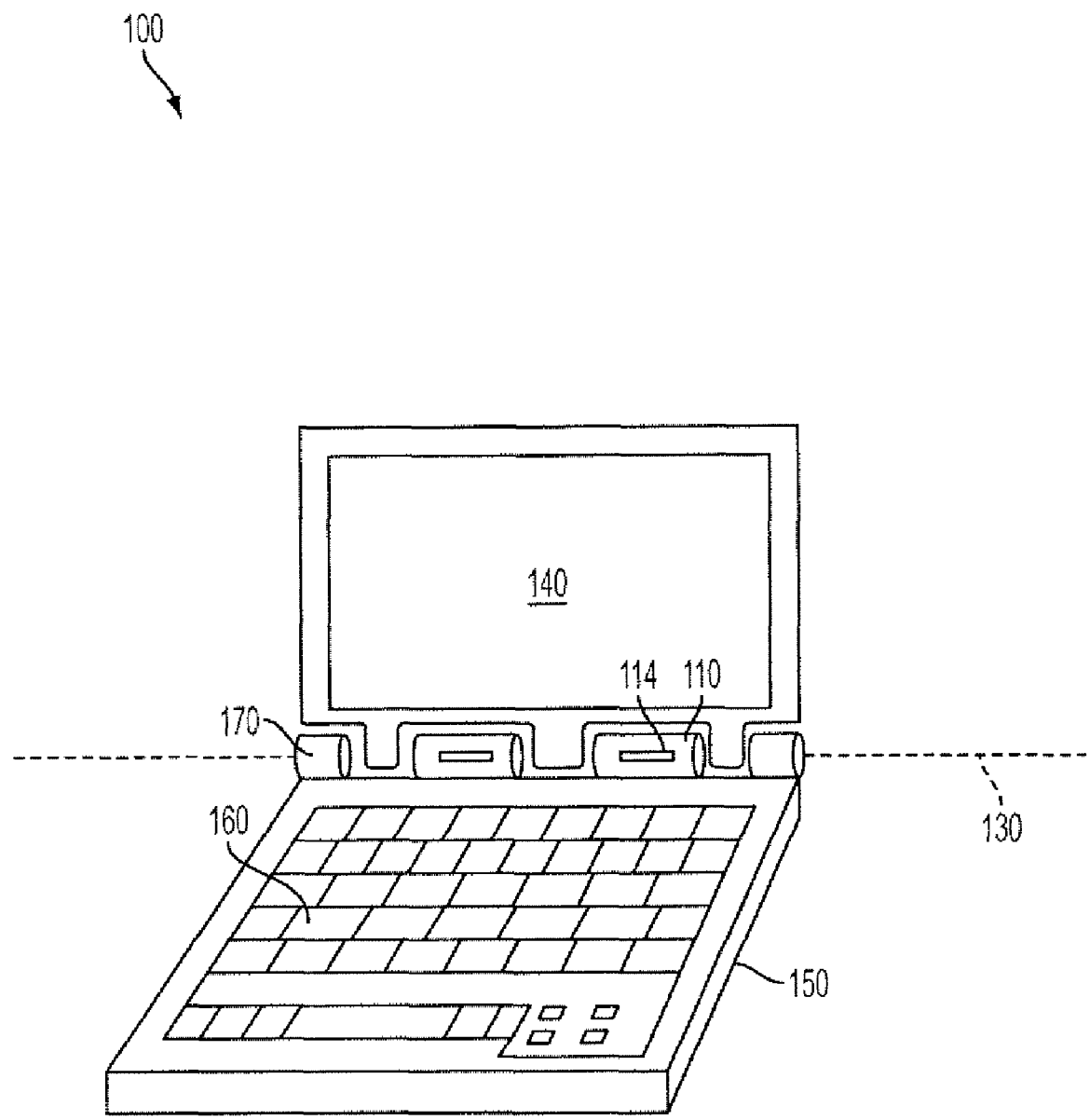
FIG. 1 is a front view of a portable computing device having a keyboard illumination device in accordance with exemplary embodiments.

Referring to FIG. 1, an exemplary portable computing device 100 may include a base unit 150. Base unit 150 may include a processor, system memory, and a persistent storage device. The portable computing device 100 may also include a keyboard 160 coupled to the top surface of the base unit 150. The portable computing device 100 may also include a hinge element 170 having a hinge axis 130. The hinge element 170 may be coupled to the base unit 150. The portable computing device 100 may also include a light-emitting display panel 140 and a light source (not shown) to illuminate the display. The light-emitting display panel 140 may be coupled to the base unit 150 by way of hinge element 170.

The portable computing device 100 may also include one or more light emitter housings 110. The one or more light emitter housing 110 may include a light emitter (not shown). The light emitter may be independent of the light source that illuminates the light emitting display panel 140. The light emitter housings 110 may be disposed in the hinge element 170. In the embodiment illustrated in FIG. 1, two light emitter housings 110 are illustrated. However, it should be appreciated that this embodiment is merely exemplary and that the portable computing device 100 may include one or more light emitter housings 110.

The output of light from the light emitter housing 110 may be adjusted or turned on and off with a user input signal. For example, operation of the light emitter housing 110 can be controlled by one or more keys on the keyboard 160. For example, the portable computing device 100 may be configured so that a first key turns the illumination from the light emitter housing 110 on and off, a second key dims the illumination, and a third key brightens the illumination. The light emission operation may also be adjusted by an alternative user input mechanism. For example, the light emission operation may be controlled through a user interface displayed on the display panel 140, a touch screen, or another button or switch located on the base unit 150 or the keyboard 160. The light emission operation could also be controlled with voice recognition techniques or methods that that employ biometric identification. It should be appreciated that all of the above examples of how the light emission may be controlled are purely exemplary and non-limiting.

Figure 2:
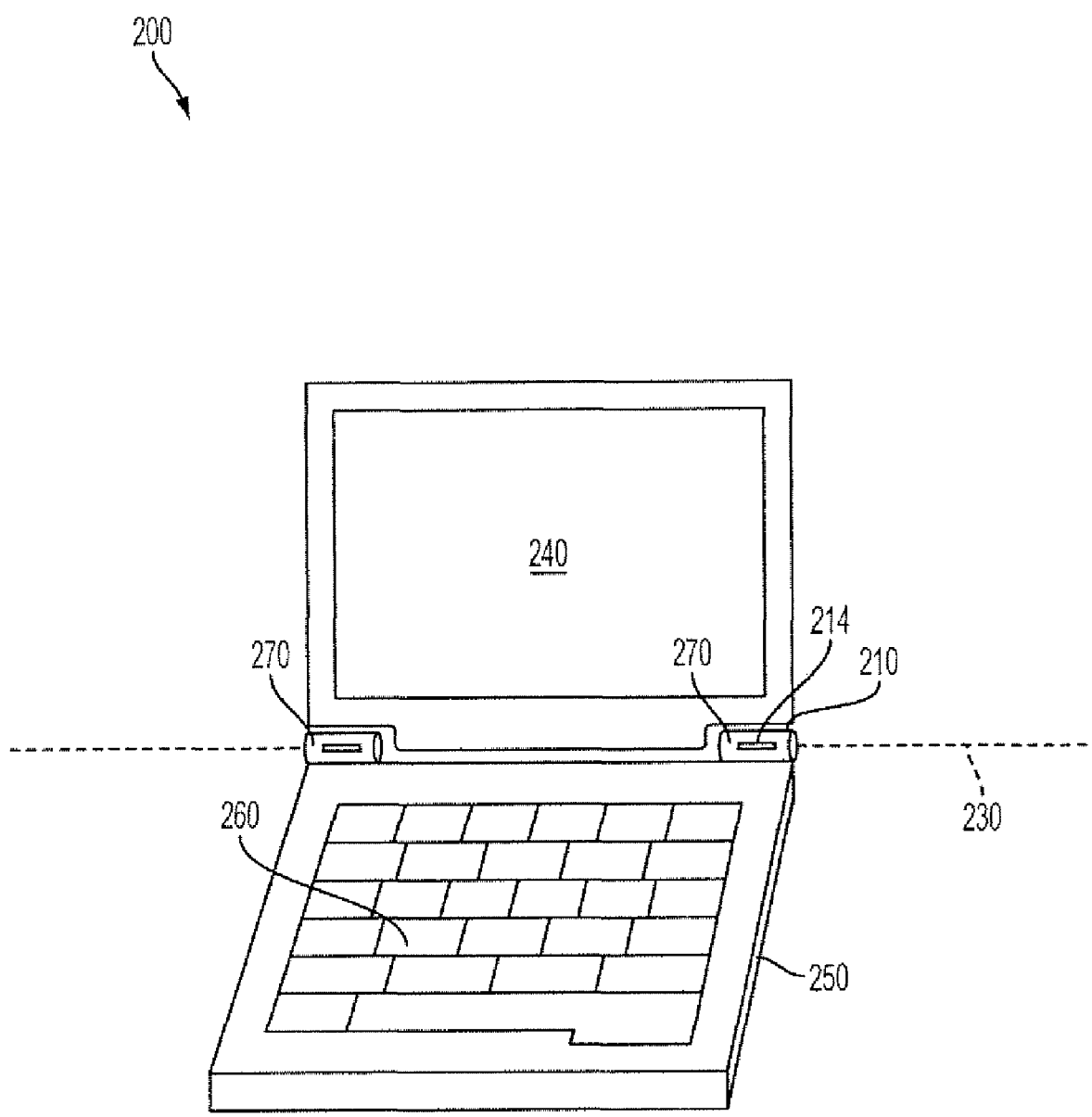
FIG. 2 is a front view of a portable computing device having a keyboard illumination device in accordance with exemplary embodiments.

FIG. 2 illustrates another exemplary embodiment for the arrangement of one or more light emitter housings 210. A portable computing device 200 may have various physical arrangements for connecting a display panel 240 to a hinge element 270. As is illustrated in FIG. 2, the hinge element 270 may be located at the far edge of the base unit 250 along the hinge axis 230. In this arrangement, the light emitter housings 210 may be configured to disperse light at an angle towards the center of the keyboard 260, so that all the keys of the keyboard 260 are illuminated. The light emitter housings 210 illustrated in the Figure are shown as being disposed along the hinge axis 230. It should be appreciated, however, that the illustration is purely exemplary and that the orientation of the light emitter housings 210 may differ from that illustrated in FIG. 2. For example, the light emitter housings 210 may be rotated toward the keyboard. In the light emitter housings 210, the position and orientation of the light emitters (not shown) may also differ from that illustrated in FIG. 2. For example, one or more light emitters may be disposed at or near the horizontal outward edge of the light emitter housing. The light emitters may be angled inward to face the keyboard. A combination of these two or other adjustments to the placement and orientation of the light emitters may also be made. The apertures 214 may also vary from what is illustrated in the Figure. In general, the size, shape, and orientation of an aperture 214 may be adjusted to facilitate light dispersion onto the keyboard.

Figure 3:
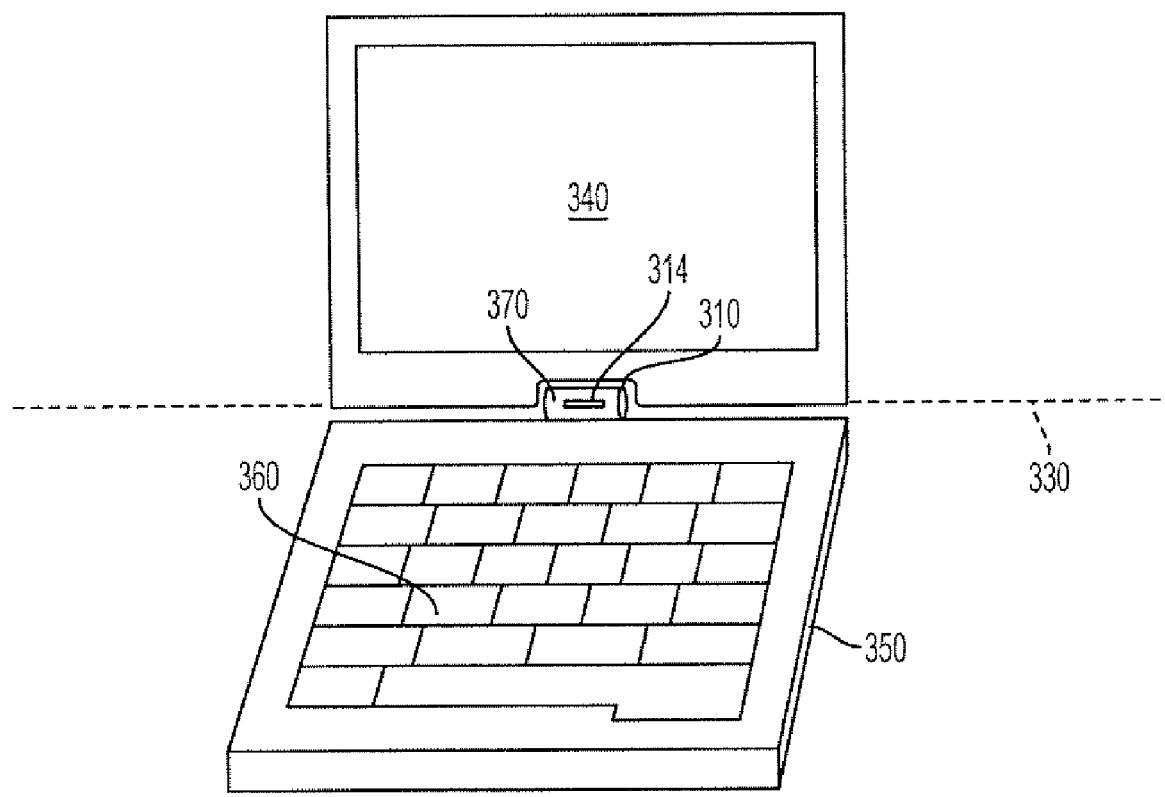
FIG. 3 is a front view of a portable computing device having a keyboard illumination device in accordance with exemplary embodiments.

FIG. 3 illustrates another exemplary embodiment for the arrangement of one or more light emitter housings 310. The hinge element 370, as illustrated in this exemplary embodiment, may be a relatively short strip or point source located in the center of the base unit along the hinge axis 330. The relatively short hinge element 370 depicted in FIG. 3 may have length sufficient to incorporate a single light emitter housing 310. The single light emitter housing 310 may be configured to disperse light emanating from the light emitter at a wide enough angle to illuminate the entire keyboard 360. It should be appreciated that the light emitter housings may include one or more light emitters, and that multiple such housings may be present. The hinge element 370 may form the boundaries of the light emitter housing 310. In other words, the light emitter housing 310 may be disposed in the hinge element 370.

Figure 4A:
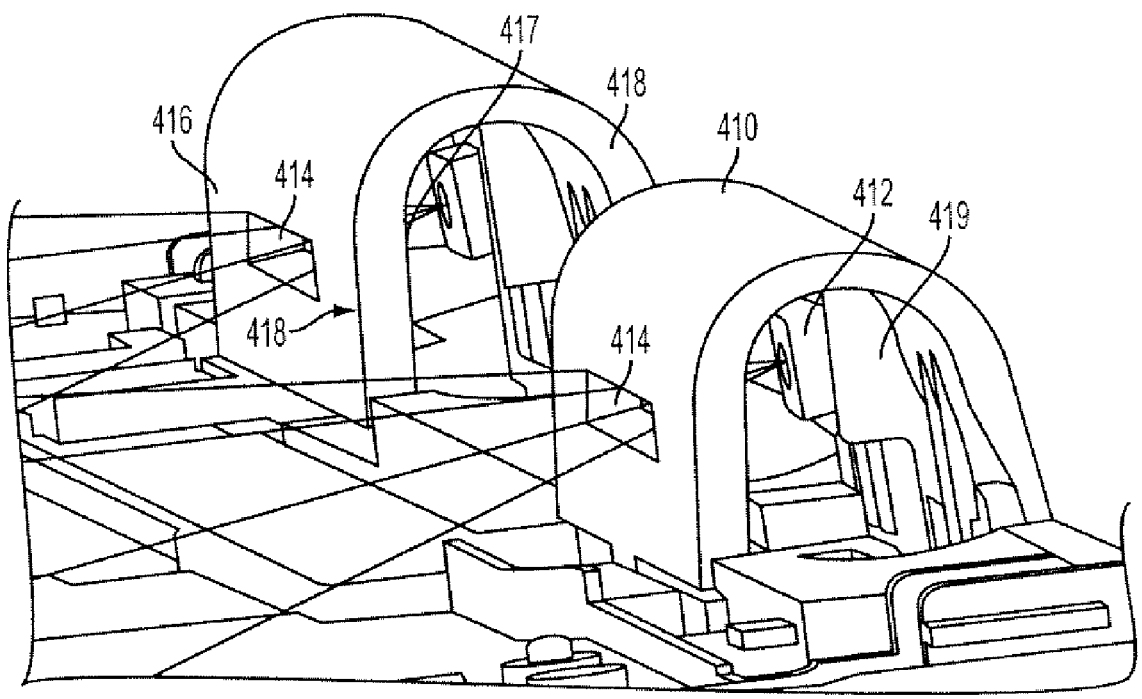
FIG. 4a is an upper diagonal view of a pair of light emitter housings in accordance with exemplary embodiments.

FIG. 4(a) illustrates an exemplary embodiment of a pair of light emitter housings 410. The light emitter housing 410 may include a frontside 416 and a backside 418. The light emitter housing 410 may include a light emitter 412, which is connectively coupled to a mount 419 on the backside 418 of the light emitter housing 410. The light emitter 412 is pointed at a slightly downward angle relative to the base unit 450. The slight downward angle of the light emitter makes it more difficult for users or bystanders to see the light source directly.

Figure 5:
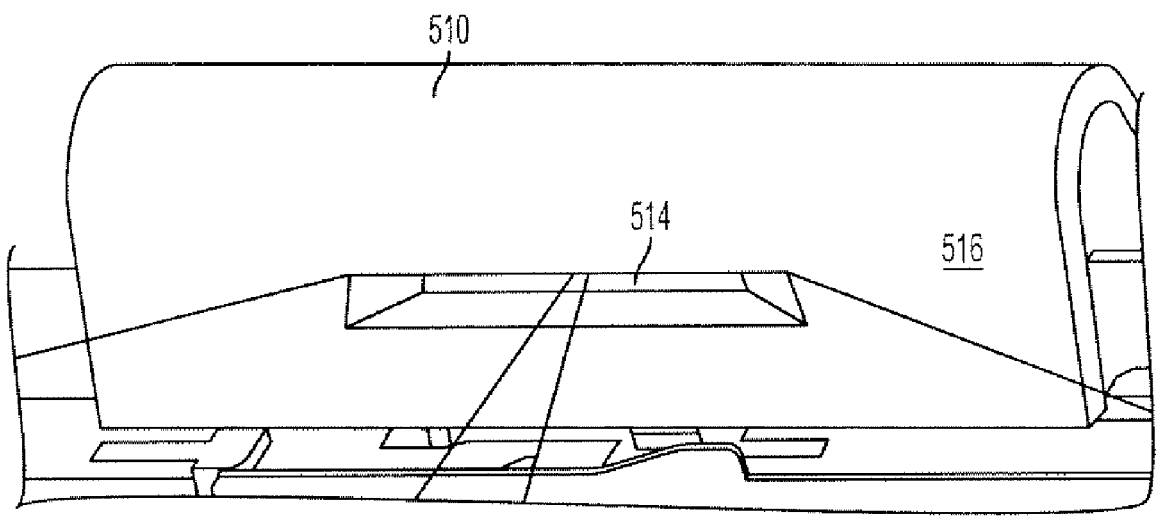
FIG. 5 is a front view of a light emitter housing in accordance with exemplary embodiments.

The frontside 417 of the light emitter housing 410 includes an aperture 414. The illustration in FIG. 4(a) shows that the side walls of the aperture 416 may be sloped horizontally outward so that the aperture 414 has a wider opening at the outer wall of the frontside 418 than the inner wall of the frontside 417. This allows the light emanating from light emitter 412 to be dispersed at a wide horizontal angle across the width of the keyboard 460 as is illustrated in FIGS. 4(a) and 5.

In addition to being pointed slightly downward, the light emitter 412 may be recessed back from the aperture 414. The recessing and downward angle of the light emitter 412 may advantageously prevent the direct light—as it emanates from light emitter 412 (i.e. the "hot spot" of the light emitter)—from being seen by a user or another person in the vicinity of a portable computing device.

The light emitter 412 may be a 120 degree wide angle LED. The LED may be configured to emit light of a plurality of different colors. One or more LEDs may be used, of one or more colors. Red LEDs are suitable for illumination in dark environments without impacting a user's night vision. The light emitter 412 may be an organic LED. The light emitter may be an infrared LED. The light emitter 412 may be an ultraviolet ("UV") LED, which may be used in conjunction with a keyboard treated to fluoresce in the presence of UV light. The light emitter may be a cold cathode fluorescent lamp (CCFL).

Figure 4B:
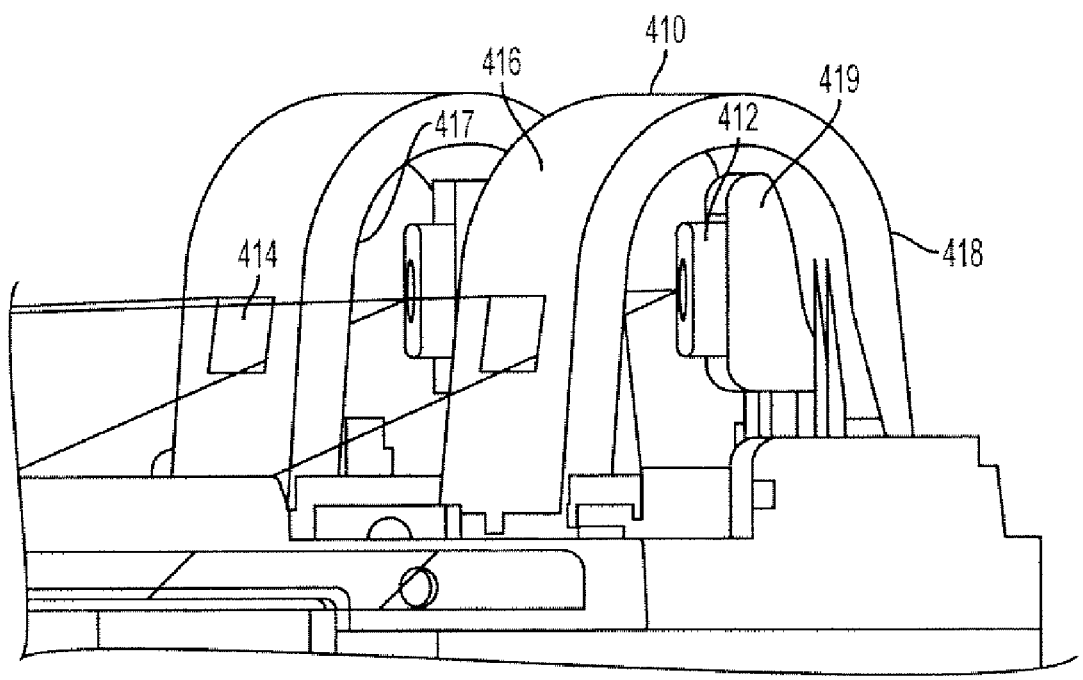
FIG. 4b is a lower diagonal view of a pair of light emitter housings in accordance with exemplary embodiments.

FIG. 4b illustrates that a bottom wall of aperture 414 may slope downward from the light emitter 412 to the keyboard 460. The downward slope of the bottom wall of aperture 414 may dictate that light will be dispersed downward to illuminate the keys on the keyboard 460 that are closest to the light emitter housing 410, such as the function keys. Alternatively, aperture 414 may be configured to illuminate other portions of the keyboard, such as the front.

FIGS. 4(a) and 4(b) both illustrate exemplary embodiments in which the aperture 414 is a rectangular shape. It should be appreciated, however, that this embodiment is merely exemplary, and that the aperture is not limited to any particular shape. In some embodiments, the direction of the aperture is adjustable.

FIG. 5 illustrates an exemplary embodiment of a light emitter housing 510. Specifically, FIG. 5 provides a straight-on view of an aperture 514 on the frontside 516 of a light emitter housing 510. FIG. 5 provides an additional illustration of the sloped side walls of aperture 514 mentioned above in the discussion of FIG. 4(a). Sloping the walls of the aperture allows for the light emanating from the light emitter to be dispersed over a wide enough angle to illuminate all the keys on the keyboard.

FIG. 5 also illustrates an exemplary embodiment in which the aperture 514 is rectangular in shape. Again, it should be appreciated that this is merely an exemplary embodiment, and that the aperture is not limited to any particular shape.

Figure 6:
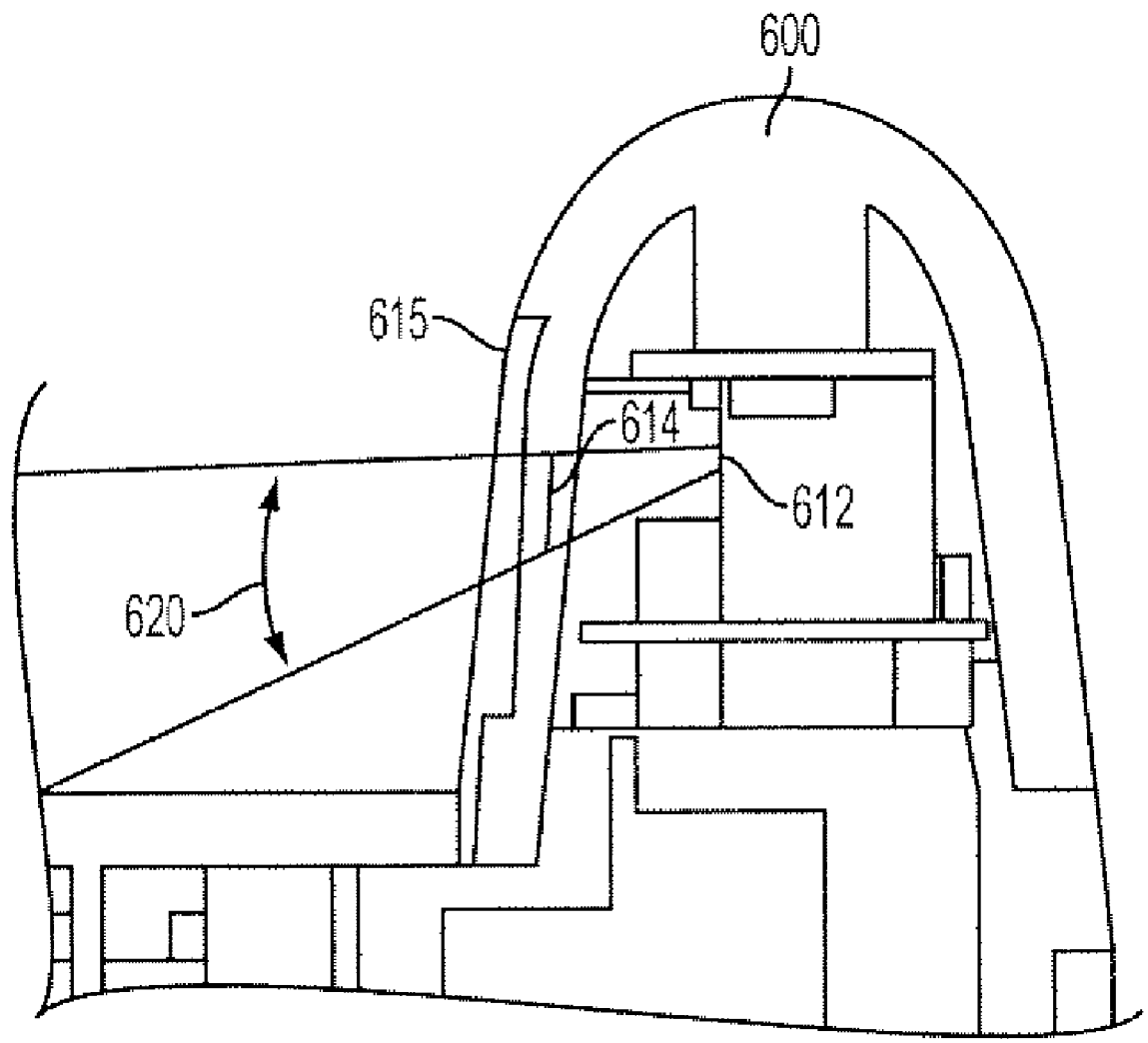
FIG. 6 is a side view of a light emitter housing in accordance with exemplary embodiments.

FIG. 6 illustrates an exemplary embodiment of a light emitter housing shown from a side view. The light emitter 612 is shown as being recessed from the aperture 614. The aperture 614 is covered by a lens 615. This lens helps further disperse the light coming out of the aperture. The lens may be clear. Alternative embodiments may include a plurality of different colors so that whatever color light the user of the portable computing device wishes to illuminate their keyboard with, they can simply use a lens of that color. FIG. 6 also illustrates how the aperture 614 is configured to dictate how the light beam 620 emanating from light emitter 612 may be dispersed onto the keyboard.

Figure 7:
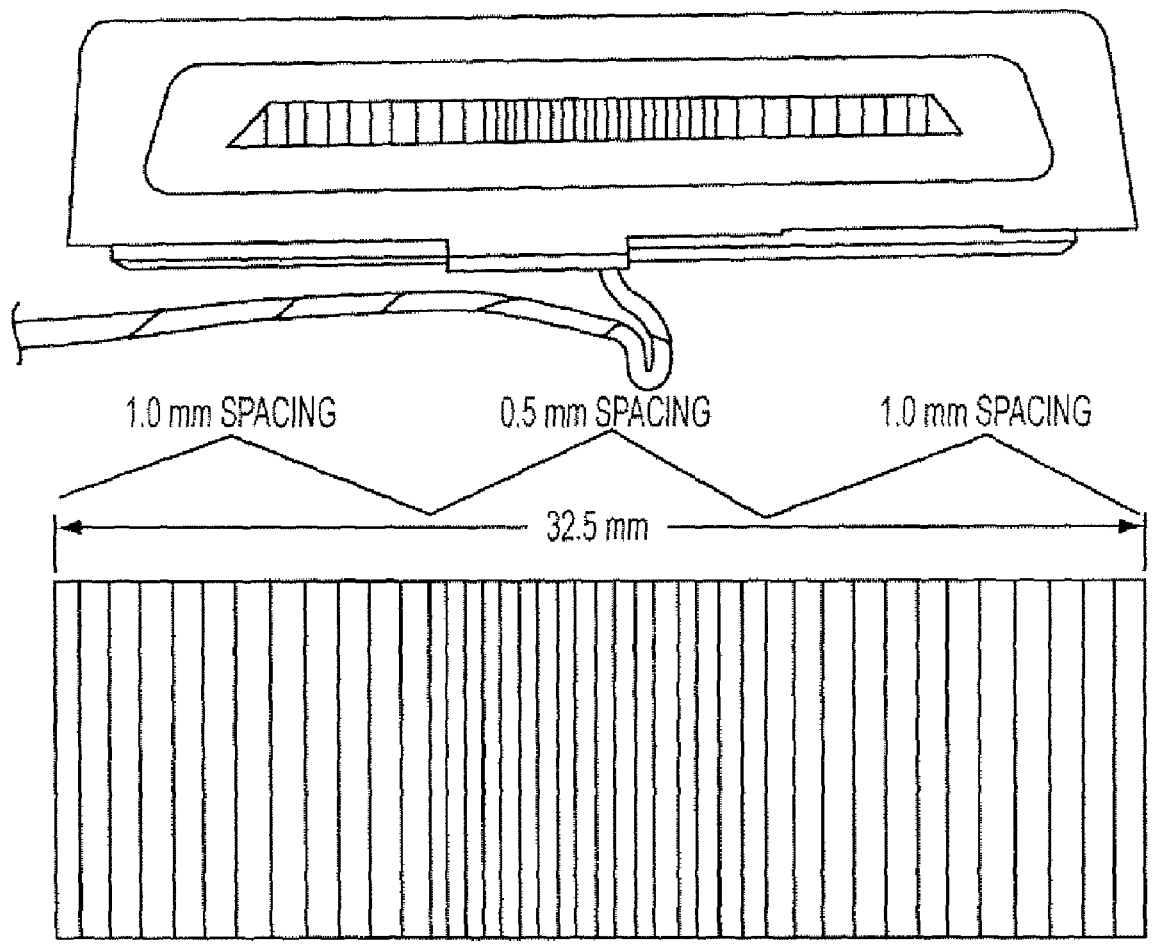
FIG. 7 illustrates a light emitter housing with a lens covering the aperture in accordance with exemplary embodiments.

FIG. 7 illustrates an exemplary embodiment light emitter housing with a lens covering the aperture. It should be appreciated that inclusion of a lens is purely exemplary, and that the aperture may function without a lens. The lens illustrated in FIG. 7 may include thin slices (e.g. a Fresnel lens) to cause the light to diffract and in turn create a wider viewing angle. The light emitter housing in FIG. 3 may utilize a lens such as that illustrated in FIG. 7, because the wider angle of light dispersion may allow a single light emitter to illuminate the entire keyboard. The wide dispersion of light may also be accomplished without a Fresnel lens, e.g., by texturing or frosting the surface of the lens.

Figure 8:
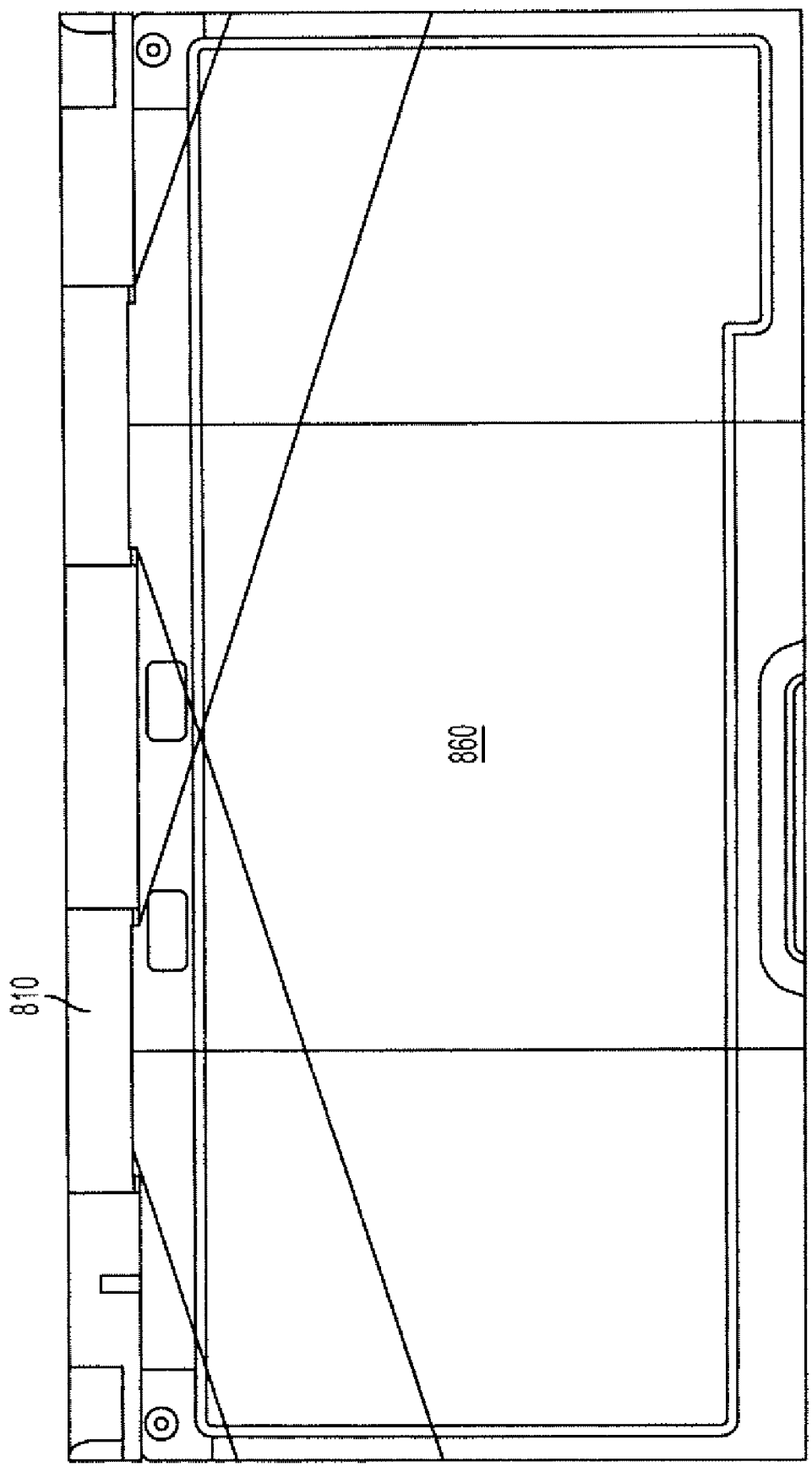
FIG. 8 is a birds eye view of two light emitter housings dispersing light onto a keyboard in accordance with exemplary embodiments.

FIG. 8 is an exemplary embodiment of light emitter housings 810 dispersing light onto the keyboard 860. FIG. 8 illustrates that the one or more light emitter housings are configured to illuminate or at least partially illuminate every key on the keyboard 860. It should be appreciated that this embodiment is merely exemplary and that the keyboard may be fully illuminated with a single light emitter housing 810, or more than two light emitter housings 810.

Figure 9:
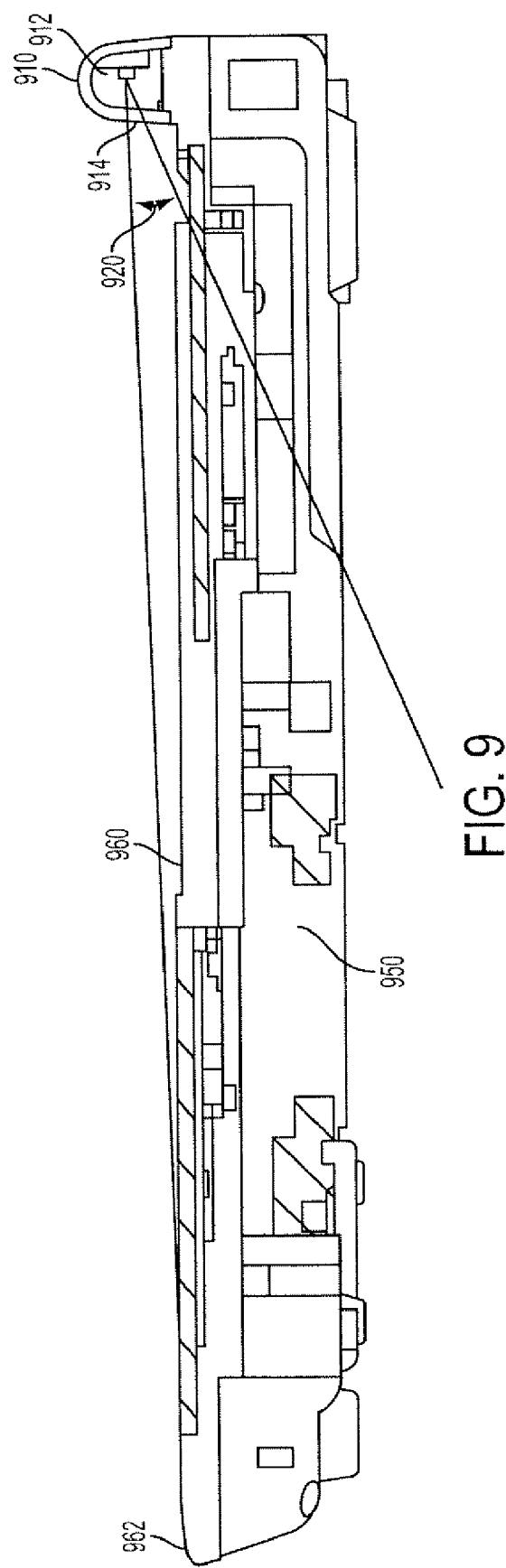
FIG. 9 is a side view of a light emitter housing dispersing light onto the keyboard in accordance with exemplary embodiments.

FIG. 9 illustrates an exemplary embodiment of at least one light emitter housing 910 dispersing light onto a keyboard 960. The upper and lower boundaries of the light beam 920 are illustrated in the figure. This range of vertical light dispersion may be dictated by the angle of the inner walls of the aperture 914. As illustrated, the light beam 920 may be angled slightly downward with respect to the horizontal plane of the top surface of the base unit 950. The downward angle allows the top of light beam to extend no further than the edge 962 of the top surface of the base unit 950. The aperture 914 may be configured so that the bottom of light beam 920 comes into contact with the keyboard just above the function row of keys.

Some embodiments may be capable of illuminating paper or other objects on or in proximity to the keyboard. In such embodiments, the light emitter housing may be configured to project light beyond the keyboard, e.g., in from of the keyboard, to the side of the keyboard, or a combination thereof.

Figure 10:
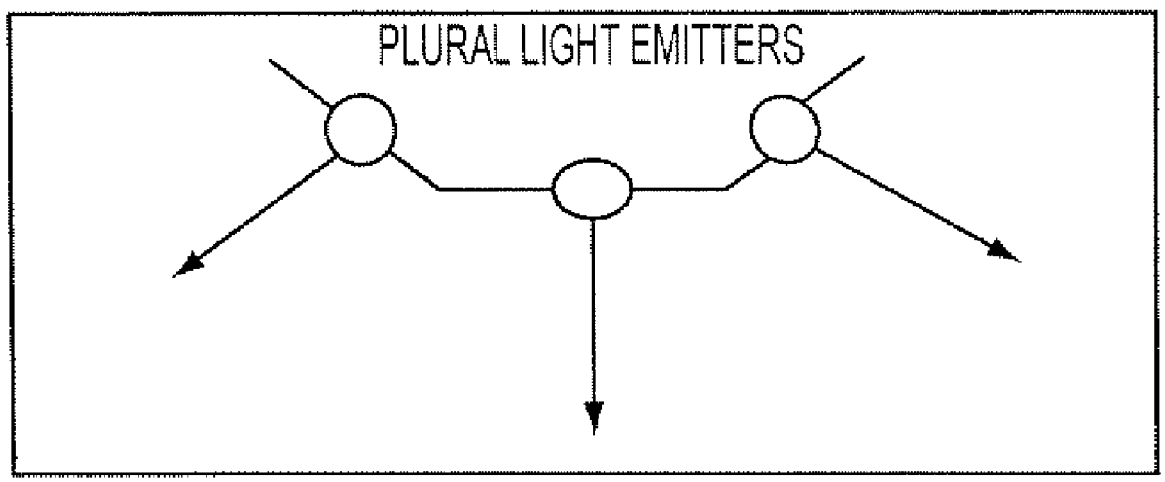
FIG. 10 illustrates plural light emitters in a light emitter housing in accordance with exemplary embodiments.

FIG. 10 illustrates plural light emitters disposed in a light emitter housing. It should be appreciated that light emitter housings may be arranged to include plural light emitters as illustrated in FIG. 10. FIG. 10 shows three light emitters in a light emitter housing. It should be appreciated, however, that this is merely exemplary and that a light emitter housing may have more or fewer light emitters. Using plural light emitters may provide beneficial illumination results in the form of a wider dispersion angle. The wider dispersion angle may be achieved using multiple light emitters without a lens covering the aperture.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A system for illuminating a keyboard of a portable computing device, the system comprising:
a base unit comprising a top surface, with a keyboard coupled thereon, and a hinge element comprising a hinge axis, wherein the hinge element comprises one or more light emitter housings configured to disperse light onto the keyboard;
a light-emitting display panel coupled to the hinge element of the base unit, wherein the light-emitting display panel is movable about the axis of the hinge element relative to the base unit;
each of the one or more light emitter housings comprising a light emitter configured to illuminate the keyboard;
wherein the light emitter housings do not move with the display panel; and
wherein the light emission operation of each light emitter is independent of the light emission operation of the light emitting display panel.

2. The system of claim 1, wherein each of the one or more light emitter housings comprises a backside and a frontside, wherein the frontside comprises an aperture configured to disperse light onto the keyboard, and wherein the light emitter is recessed back from the aperture.

3. The system of claim 1, wherein the base unit defines a horizontal plane and the light emitter emits light at a downward angle relative to the horizontal plane.

4. The system of claim 1, wherein the at least one light emitter housing has no moving parts.

5. The system of claim 1, wherein the light emitter can be turned on and off with a user input selection.

6. The system of claim 5, wherein the user input selection comprises an action selected from the group consisting of: pressing a predetermined key on the keyboard, pressing a mouse pad element, pressing a touch screen, voice activation, flipping a switch on a predetermined area of the base unit or display panel, and biometric recognition.

7. The system of claim 1, wherein illumination from the one or more light emitter housings can be adjusted without affecting the light emitted from the display panel.

8. The system of claim 3, wherein the angle allows for the dispersed light to illuminate the keyboard without substantially illuminating an area surrounding the keyboard.

9. The system of claim 1, wherein the light emitter is driven by a light source independent of a light source for the light-emitting display panel.

10. The system of claim 3, wherein the angle of the dispersed light relative to the base unit remains constant when the display is moved relative to the base unit.

11. In a portable computing device which includes one or more keypads connectively coupled to a base unit, a hinge element comprising a hinge axis and coupled to the base unit, and a light emitting display panel coupled to the hinge element and movable about the hinge element relative to the base unit, a keyboard illumination device comprising:
one or more light emitter housings, adaptable to be incorporated within the hinge element, the one or more light emitter housing comprising a light emitter and configured to illuminate the keyboard;
wherein the light emitter housing does not move with the display panel; and
wherein light emitted from the light emitter is independent of light emitted from the light emitting display panel.

12. The keyboard illumination device of claim 11, wherein each of the one or more light emitter housings comprises a backside and a frontside, wherein the frontside comprises an aperture configured to disperse light onto the keyboard, and wherein the light emitter is recessed back from the aperture.

13. The keyboard illumination device of claim 11, wherein the aperture is covered by a lens.

14. The keyboard illumination device of claim 12, wherein the shape of the aperture dictates where light will be dispersed.

15. The keyboard illumination device of claim 12, wherein the top surface of the aperture is angled so that the emitted light will extend no further than the front edge of the keyboard.

16. The keyboard illumination device of claim 12, wherein the bottom surface of the aperture is angled so that the top row of keys receive illumination.

17. The keyboard illumination device of claim 8, wherein the base unit defines a horizontal plane and the light emitter is configured to emit light at a slightly downward angle relative to the defined horizontal plane.

18. The keyboard illumination device of claim 11, wherein the light emitter is selected from the group consisting of: a solid state LED, an organic LED, and a CCFL.

19. The keyboard illumination device of claim 11, wherein the light emitter emits electromagnetic radiation selected from the group consisting of: red light, ultraviolet light, infrared light, and white light.

20. The keyboard illumination device of claim 11, wherein the keyboard illumination device contains no moving parts.

21. The keyboard illumination device of claim 11, wherein the emitted light extends beyond the keyboard of the portable computing device to illuminate an object in the vicinity of the portable computing device.

22. The keyboard illumination device of claim 13, wherein the lens is tinted.

23. The keyboard illumination device of claim 13, wherein the lens comprises thin slices.

24. The keyboard illumination device of claim 13, wherein the lens comprises a textured surface.

25. The keyboard illumination device of claim 13, wherein the lens comprises a frosted surface.

26. The keyboard illumination device of claim 15, wherein the LED is configured to emit a plurality of different light colors.

27. A portable computing device comprising a base unit, a keyboard, a display panel, a hinge element, and one or more keyboard illuminators comprising:

a base unit comprising a top surface, with a keyboard coupled thereon, and a hinge element located on an axis, wherein the hinge element comprises one or more light emitter housings configured to disperse light onto a keyboard, and wherein the one or more keyboard illuminators are configured such that the source of the dispersed light is not visible to the user or other bystanders;

a light-emitting display panel coupled to the hinge element of the base unit, wherein the light-emitting display panel is movable about the axis;

each of the one or more light emitter housings comprising a light emitter configured to disperse downwardly-angled light that extends no farther than a front edge of the base unit;

wherein the one or more keyboard illuminators do not move with the display panel;

wherein an angle of the dispersed Tight, relative to the base unit, remains constant when the display panel moves; and wherein the light emitter is driven by a distinct light source, wherein the light emitter light source is independent of the display panel's light source.

28. In a portable computing device which includes one or more keypads connectively coupled to a base unit, a hinge element located on a hinge axis and coupled to the base unit, and a light emitting display panel coupled to the hinge element and movable about the hinge element relative to the base unit, a keyboard illumination device comprising:

a keyboard illumination means for illuminating a keyboard while keeping the direct source of the illumination hidden from the user and others, wherein the illumination of the keyboard is not affected by a tilting of the display panel;

an illumination adjusting means for adjusting the illumination of the keyboard, wherein an adjustment of the illumination does not affect the amount of light emitted from the display.

* * * * *